United States Patent
Tomioka et al.

(10) Patent No.: US 8,215,624 B2
(45) Date of Patent: Jul. 10, 2012

(54) JIG PALLET

(75) Inventors: Masanori Tomioka, Toyokawa (JP);
Tomohisa Nakamura, Toyokawa (JP);
Susumu Fujita, Toyokawa (JP)

(73) Assignee: Sintokogio, Ltd., Aichi-Ken (JP)

( * ) Notice: Subject to any disclaimer, the term of this patent is extended or adjusted under 35 U.S.C. 154(b) by 733 days.

(21) Appl. No.: 12/296,863

(22) PCT Filed: Apr. 13, 2007

(86) PCT No.: PCT/JP2007/058186
§ 371 (c)(1),
(2), (4) Date: Apr. 1, 2009

(87) PCT Pub. No.: WO2007/119828
PCT Pub. Date: Oct. 25, 2007

(65) Prior Publication Data
US 2009/0289402 A1 Nov. 26, 2009

(30) Foreign Application Priority Data
Apr. 14, 2006 (JP) .................................. 2006-111745

(51) Int. Cl.
*B23Q 1/25* (2006.01)
*B25B 5/14* (2006.01)

(52) U.S. Cl. ......... 269/55; 269/71; 269/111; 269/289 R; 269/905

(58) Field of Classification Search .................. 269/50, 269/55, 58, 60, 71, 73, 95, 111, 152, 289 R, 269/905; 228/212, 213
See application file for complete search history.

(56) References Cited

U.S. PATENT DOCUMENTS

| 4,811,640 | A  | * | 3/1989 | Fritsch ............................ 269/73 |
| 5,149,072 | A  | * | 9/1992 | Sartorio et al. ............... 269/111 |
| 5,191,706 | A  | * | 3/1993 | Cosden ......................... 269/905 |
| 6,344,629 | B1 | * | 2/2002 | Kato et al. ..................... 219/148 |
| 6,508,393 | B2 | * | 1/2003 | Chalin .......................... 228/136 |
| 7,108,461 | B1 | * | 9/2006 | Colburn et al. ................. 269/95 |
| RE41,223  | E  | * | 4/2010 | Dellach ....................... 403/322.3 |

FOREIGN PATENT DOCUMENTS

| JP | 6-219543 (A)    | 8/1994  |
| JP | 9-52180 (A)     | 2/1997  |
| JP | 2003-145359 (A) | 5/2003  |
| JP | 2004-224012 (A) | 8/2004  |
| JP | 2006-341327 (A) | 12/2006 |

OTHER PUBLICATIONS

International Search Report dated May 15, 2007.

* cited by examiner

*Primary Examiner* — Hadi Shakeri
(74) *Attorney, Agent, or Firm* — Finnegan, Henderson, Farabow, Garrett & Dunner, L.L.P.

(57) ABSTRACT

A jig pallet for conveying a workpiece that is placed on it and has a portion to be worked. The jig pallet has a conveyance carriage (A) movable along a production line, a workpiece receiving member (B) provided on the conveyance carriage (A) and on which the workpiece is placed, a pressing mechanism (E) to be placed so as to face a peripheral section of a to-be-worked portion of the workpiece placed on the workpiece receiving member (B), and an opening/closing member (D) on which the pressing mechanism (E) is provided. When the opening/closing member (D) is closed, the pressing mechanism (E) presses a peripheral section of the to-be-worked portion of the workpiece from above, and when being opened, the pressing is released, enabling the opening/closing member (D) to be opened and closed, with one end of the conveyance carriage (A) functioning as the support point, and allowing the workpiece to be taken out.

12 Claims, 7 Drawing Sheets

JIG PALLET

FIELD OF THE INVENTION

This invention relates to a jig pallet that clamps a workpiece when it is assembled and processed. It more particularly concerns a jig pallet that can be suitably used for an assembly line such as a door-trim assembly line.

BACKGROUND OF THE INVENTION

Examples of workpieces are components of an automotive door-trim for an assembly line, or a semifinished door-trim assembly to be completely assembled. A conventional automotive door-trim assembly adapted to be used for an automated assembly line includes an upper door-trim and a lower door-trim, etc., as shown in, e.g., Japanese Early-Patent Publication No. 2004-224012. The upper door-trim has a laminated structure in which a scarfskin adhesive is placed on the surface of a resin core, and in which the lower door-trim is an injection-molded synthetic resin. To bring together the upper and lower door-trims, bosses for welding are provided on a rim of the lower door-trim to be coupled to the upper door-trim such that they stand along the rim with predetermined pitches therebetween. The bosses of the lower part are then inserted in holes for mounting are punched on the upper door-trim to form a semifinished door-trim assembly. The semifinished door-trim assembly is then loaded in an ultrasonic welding and bonding machine having clamps or metal braces clamping the upper and lower door-trim. In this state, the semifinished door-trim assembly is ultrasonically welded and bonded such that the upper and lower door-trims are coupled together.

When the ultrasonic welding and bonding is applied, if an undesirable gap forms between any boss and the periphery of the mated holes for mounting at the junction of them, this causes a space to occur between the upper part and the lower part of the door-trim at the junction of them, which degrades their adhesiveness. In practice, the peripheries of portions of the workpiece to be processed by the ultrasonic welding and bonding are clamped, to protect the peripheries from being lifted up, to avoid an undesirable gap. In addition, in an assembly line, processes for bending weather-strip claws, for inserting retainers, and for fastening threads, are also carried out, as well as the ultrasonic welding and bonding process being carried out.

In the conventional assembly line, holders for holding the workpieces are installed in an ultrasonic-welding and bonding machine, or in a machine for bending weather-strip claws, or a machine for inserting retainers. The holders have respective junctions dedicated to the corresponding machines. The clamps on the junctions of the holders are also dedicated ones designed based on the number of processes to be applied to the junctions of the respective machines on the line. Because the respective machines thus use the dedicated holders that are also dedicated and formed for the respective machines, no holder can share a machine on the same line. This causes problems involving the need to providing mechanisms to convey the workpieces between the respective machines on the same line, increasing costs to produce the respective machines and thus the door-trim assemblies to be assembled therefrom, and a setback in improving productivity.

Accordingly, an object of the present invention is to provide a jig pallet that can be shared in the assembly line, and that has a general versatility.

SUMMARY OF THE INVENTION

The jig pallet of the present invention is one for carrying and conveying a workpiece having a portion to be processed. This jig pallet comprises a carriage that can be moved along an assembly line; a receiving member provided with the carriage to receive the workpiece thereon; a pressing member arranged to face the peripheries of the portion to be processed; and an openable and closable member associated with the pressing member, wherein the openable and closable member is pivotally supported by one end of the carriage to move between a closed position in which the pressing member bears down on and presses the peripheries of the portion to be processed of the workpiece and an open position in which the pressing of the pressing member is released to remove the workpiece therefrom.

To save weight, at least either the carriage or the openable and closable member may have a framework.

The jig pallet may further include an adjusting mechanism to adjust the vertical position and the horizontal position of the pressing member. In this case, the openable and closable member may have a framework that has guiding grooves to horizontally guide the pressing member.

In one embodiment of the present invention, a plurality of bearings is arranged in the carriage. In this case, the jig pallet further includes an opening and closing mechanism for opening and closing the openable and closable member. The opening and closing mechanism includes a rotary shaft that is rotatably supported by the bearings at a side opposed to the openable and closable member. The jig pallet further includes an opening and closing lever fixed to the rotary shaft such that the opening and closing lever engages an engaging member of a driving mechanism for driving the opening and closing mechanism to open and close the openable and closable member.

The opening and closing mechanism has a shock absorber to absorb any impact caused by its opening and closing.

The jig pallet may be provided with a detecting means for detecting positions where the openable and closable member is opened and closed, or a sensing means for sensing the presence of the workpiece on the receiving member, or both.

The carriage may include a position-sensing means for sensing that the jig pallet has reached a predetermined working position of a processing machine on the assembly line, and may include a positioning member to position the jig pallet. In this case, the jig pallet may be provided with an external manufacturing control system for controlling the production based on a signal from the position-sensing means.

Preferably, the receiving member has a molded main body composed of a base material of a fiber-reinforced plastic. More preferably, the skin of the molded main body is made of a urethane rubber.

Processing machines having working tools are arranged on the assembly line. Preferably, the shape of the pressing member includes one to match the cross-sectional profile of the corresponding working tool.

The pressing member may consist of two or more groups of pressing members. Each pressing member of one group may differ from that of another group or other groups in its shape.

THE PREFERRED EMBODIMENT OF THE INVENTION

In reference to the accompanying figures, the jig pallet of the present invention will now be explained. The jig pallet of the present invention is a jig pallet for carrying a workpiece and transporting it along an assembly line where various processing machines are arranged.

The workpiece in the present invention includes, but is not limited to, components to constitute an automotive door-trim assembly or its semifinished product to be completely assembled, in an assembly line of automotive door-trim assemblies, such as an upper-door trim, a lower-door trim, an arm rest, a pocket, an ornament, and a weather strip.

The various processing machines include, but are not limited to, an ultrasonic welding and bonding machine, a bonding machine for bending weather-strip claws, a machine for inserting retainers, a machine for fastening threads, and a machine for hot-melting, in the assembly line of the automotive door-trim assemblies.

When these machines process a workpiece using their working tools for, e.g., welding and bonding, bending the claws, fastening the threads, and inserting the retainers, the peripheries of the areas to be processed of the workpiece should be clamped to prevent any lifting such that the areas to be processed are fixed in the predetermined arrangement. Otherwise, an undesirable gap or shift is formed between the mated components to be welded, or inserted and received.

To this end, a jig pallet of one embodiment of the present invention, as shown in FIGS. 1-7, includes a transporter (a carriage) A, a receiving member B placed thereon for receiving a workpiece, and openable and closable members D. The openable and closable members D are arranged such that they face the peripheries of the areas to be processed of the workpiece to be placed on the receiving member B. Each openable and closable member D moves between its closed position to bear down and to press the peripheries C (see FIG. 7) of the areas to be processed of the workpiece on the receiving member B, and its open position, to release the processed workpiece that has been completely treated with all the treating processes.

The illustrative transporter A has a framework in which aluminum grooved frames are assembled to form two-tiered grids, to save weight. In the illustrative embodiment, the transporter A is conveyed while being placed on a pair of conveying chains L1 (FIGS. 2,6 and 7), which are arranged along the traveling direction L of an assembly line with a predetermined interval between the chains L1. Thus the bottoms and outsides of the opposed side frames A1 of the transporter A are provided with guiding members 1. Preferably, each guiding member 1 is wear-resistant. Note that the configurations of the transporter A and means for conveying it are not limited to the illustrative embodiments.

Mounted on a central frame A2 (FIG. 3) of the transporter A is a detector 2 for detecting the workpiece on the receiving member B. One example of a primary detecting element 2a of the detector 2 may be a sensor that can be inserted in a cutout formed on the receiving member B, to detect the workpiece thereon by contacting or not contacting it. As such a detector 2, this embodiment uses, but is not limited to, a touch switch.

Figure 1:
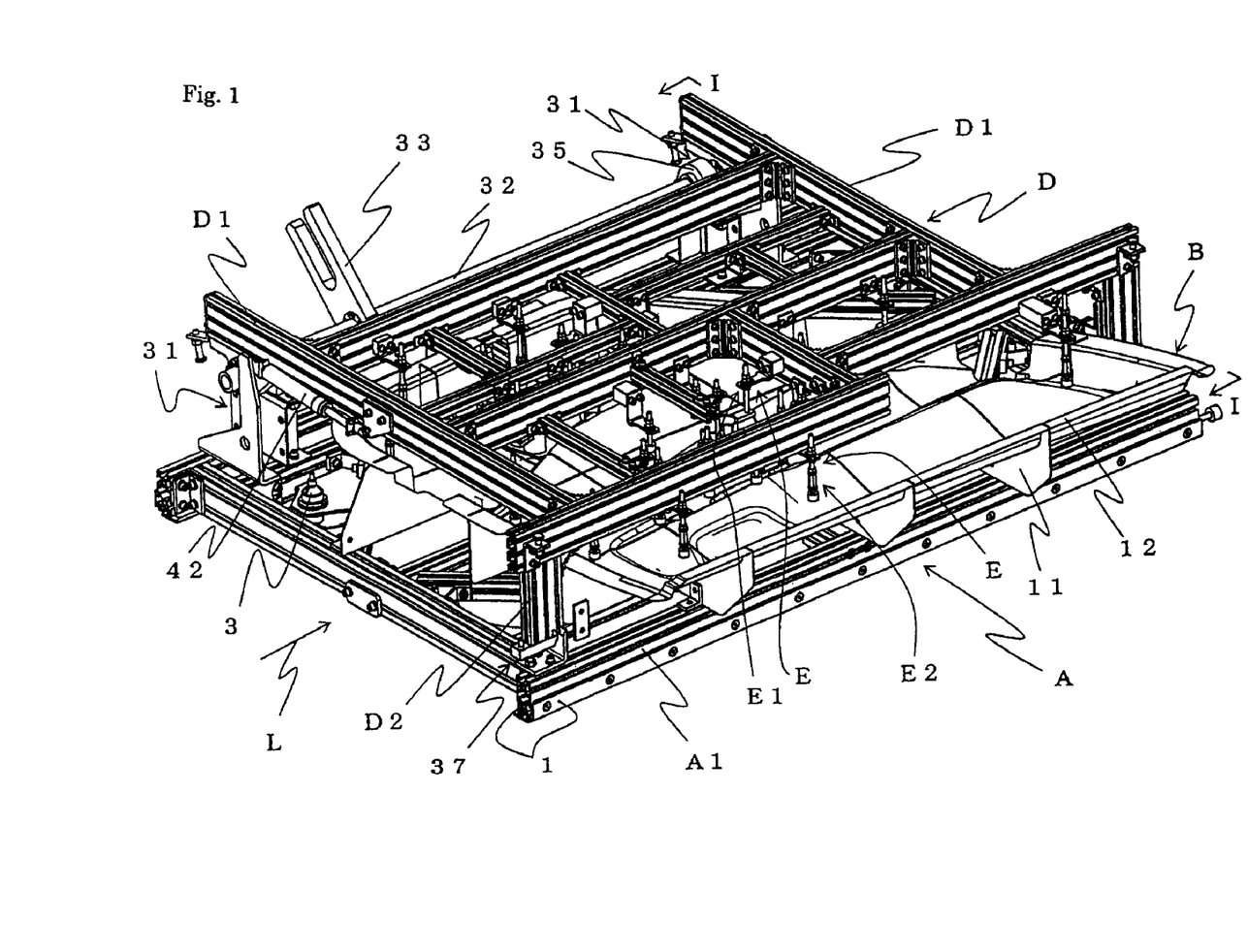
FIG. 1 is a perspective view of the jig pallet of an embodiment of the present invention.
Figure 2:
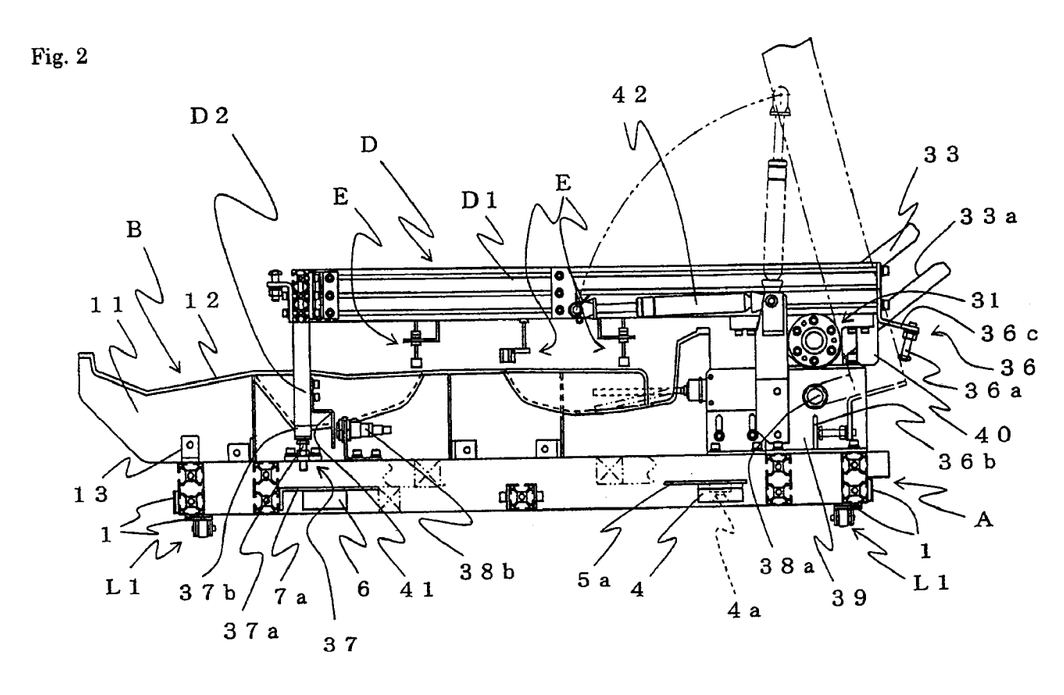
FIG. 2 is a cross sectional view taken along lines I-I in FIG. 1 to show the jig pallet with parts omitted.
Figure 3:
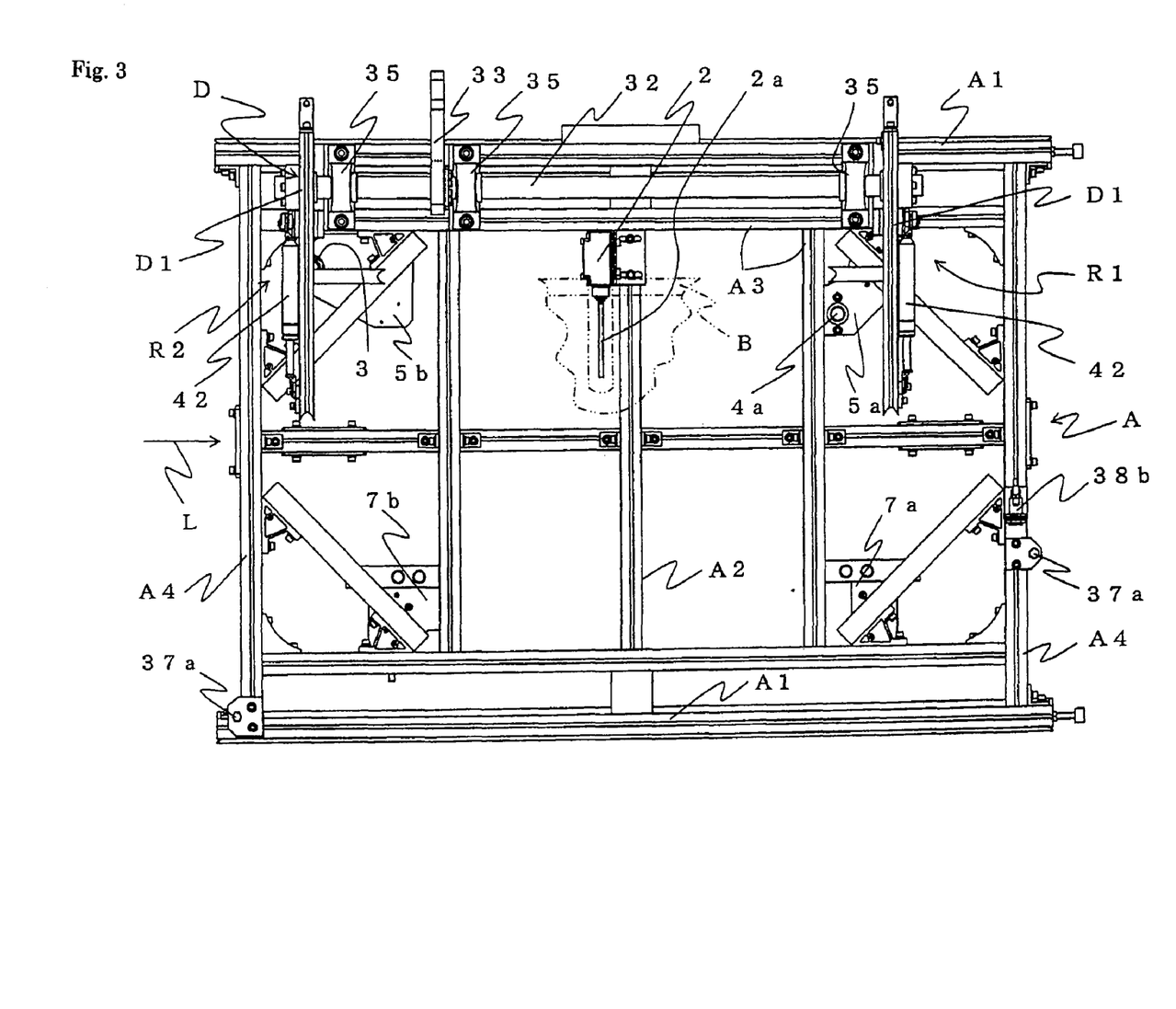
FIG. 3 is a plan view of the jig pallet as shown in FIG. 1 with a partly cross sectional view of the receiving member and the openable and closable member.

As shown in FIGS. 1, 2, and 3, an inner frame A3 is located on a front corner R1 and a rear corner R2, which are located at the front and rear respectively of the traveling direction L, of the four corners of the transporter A. The inner frame A3 is provided with a positioning sensor 3 for sensing that a jig pallet has been conveyed to the predetermined working position for the particular pressing machine, and with a positioning member 4 for positioning the jig pallet.

In this embodiment, the positioning sensor 3 and the positioning member 4 are fixed to the frame A3 through L-shaped plates 5a and 5b. In FIG. 2, for the sake of clarity the illustrations of the positioning member 4, the side frame A4, and its associated members, are omitted.

Positioning the jig pallet is carried out in the following way. Sensing the positioning sensor 3 by a mated sensor (not shown) at a predetermined position on each processing machine causes the conveying chains L1 to stop. Then a corresponding vertically movable positioning pin (not shown) on the assembly line is lifted and inserted in a bore 4a formed on the positioning member 4, to position the jig pallet.

In this embodiment, the positioning sensor 3 may provide, to a manufacturing control system (not shown), a signal indicating that the jig pallet has been conveyed to the predetermined working position for the particular processing machine. This enables the manufacturing control system to check the current position of the jig pallet on the assembly line, and thus controls the manufacturing processes (processing processes) of the door-trims.

The transporter A is provided with a supporting member 6 at each of its four corners. In this embodiment, just one supporting member 6 also has the function of the positioning member 4. The supporting members 6 are also fixed to the frame A3 through the L-shaped plate 5b and L-shaped plates 7a and 7b.

In this embodiment, before the processing process of each processing machine starts, lifting members (not shown), one of which is arranged at each of the four predetermined positions on each processing machine, lift the jig pallet while they are supporting the supporting members 6 and the positioning members 3 from beneath them. The upper part of each processing machine is provided with a fixing member (not shown) facing the jig pallet at the predetermined position. The upper face of the openable and closable member D on the lifted jig pallet is then pressed into contact against the mated fixing member of the mated processing machine such that the jig pallet is fixedly supported. Following this the mated processing machine begins the processing.

The receiving member B is provided with legs 11, which are arranged as a grid-like structure, and a body 12 fixed thereon. The legs 11 are fixed to the transporter A through an L-shaped plate 13 and fasteners (not shown). The legs 11 may be made of a steel plate or a synthetic resin to form the grid-like structure. The body 12 may comprise, e.g., a base, which is plastic, and which is molded using a fiber-reinforced plastic to match the profile of the workpiece to be processed, and a skin (a protective layer) adhered on the base. To enhance workability, the fiber-reinforced plastic molded base may preferably be provided with a surface coat by applying a urethane rubber having fluidity and by drying it. In the conventional receiving member, although a typical body is one in which a molded plastic block with a protective layer is adhered thereon, a disadvantage of such a body is its weight.

Figure 4:
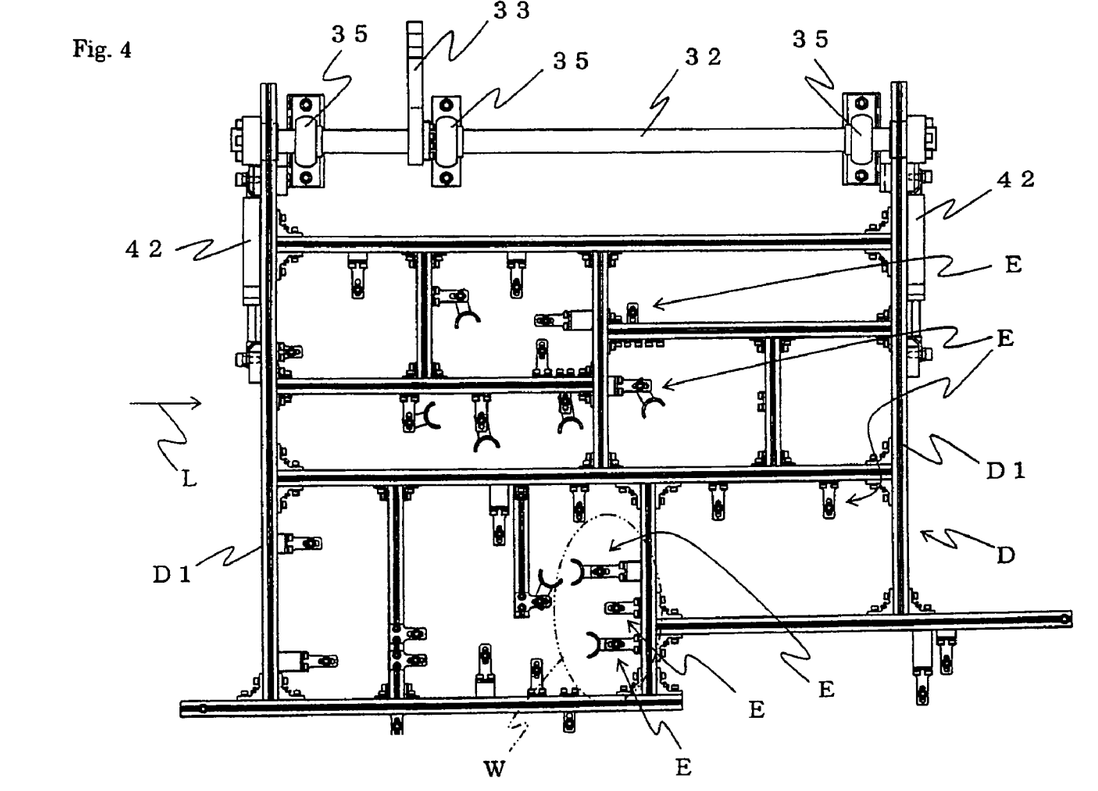
FIG. 4 is a plan view of the openable and closable member of the jig pallet as shown in FIG. 1.
Figure 5:
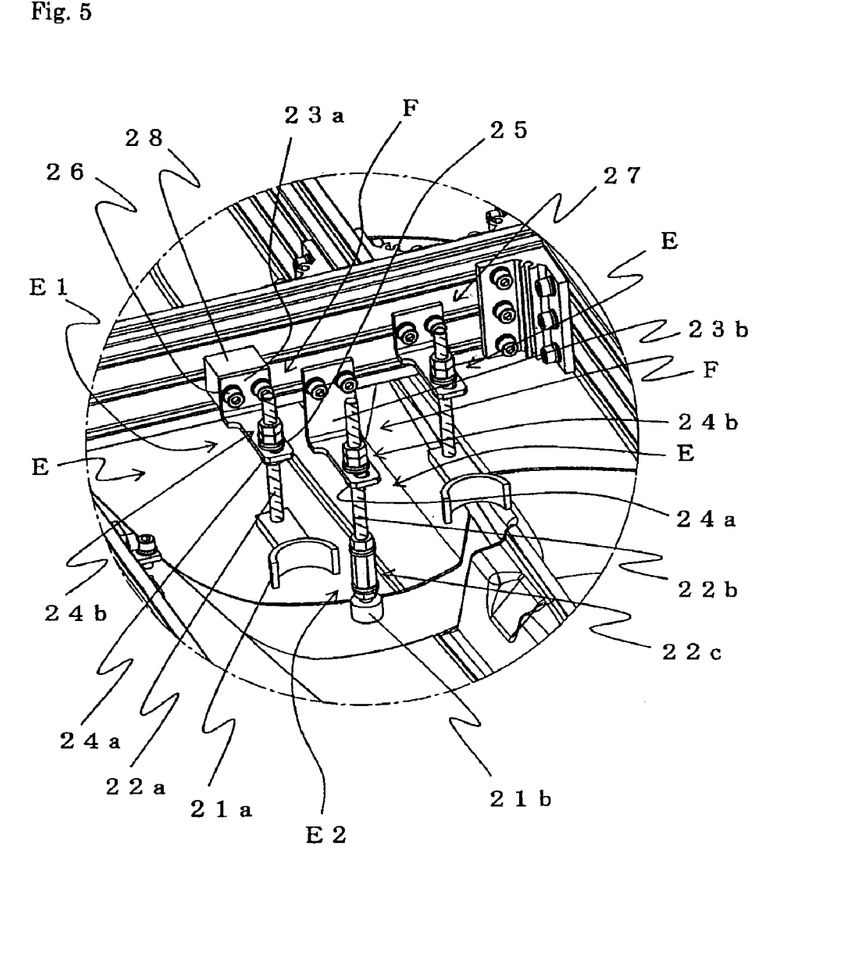
FIG. 5 is a perspective view of the pressing mechanism in the elliptical region W denoted in FIG. 4.
Figure 6:
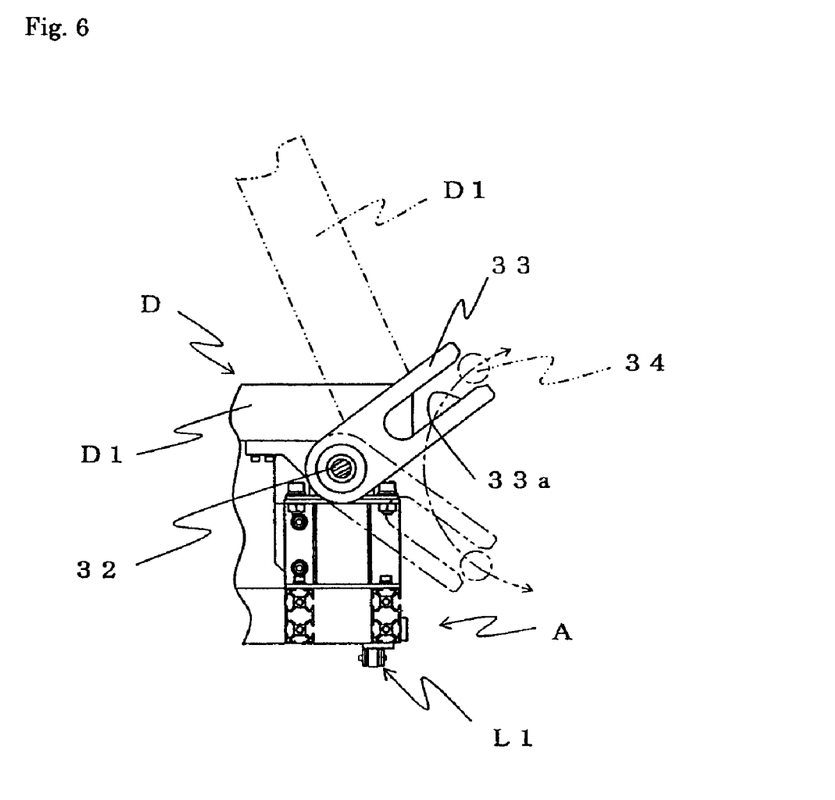
FIG. 6 is a fragmentary side view to illustrate the turning motion of the openable and closable member of the jig pallet as shown in FIG. 1.

To save weight, the openable and closable member D may be, for example, a framework in which aluminum grooved frames are assembled to form three-tiered grids, similar to the transporter A. The openable and closable member D includes pressing mechanisms E. They are arranged such that they face the peripheries C of the predetermined areas to be processed of the workpiece, and an opening and closing mechanism for pivotally opening and closing the openable and closable member D at one end of the transporter A. Each pressing mechanism E includes, as shown in FIGS. 1, 4, and 5, pressing rods E1 and E2 for pressing the peripheries C (see FIG. 7) of the predetermined areas to be processed of the workpiece, and adjusters F for adjusting the vertical and horizontal positions of the pressing mechanism E. The number and arrangements of the pressing mechanisms E are configured in line with the numbers and positions of the areas to be processed. The pressing rods are also shaped such that they can be anchored, e.g., the upper-door trim and the lower-door trim being anchored in positions to prevent an undesirable gap between their components, and can hold the peripheries C of the predetermined areas of the workpiece to be processed.

Figure 7:
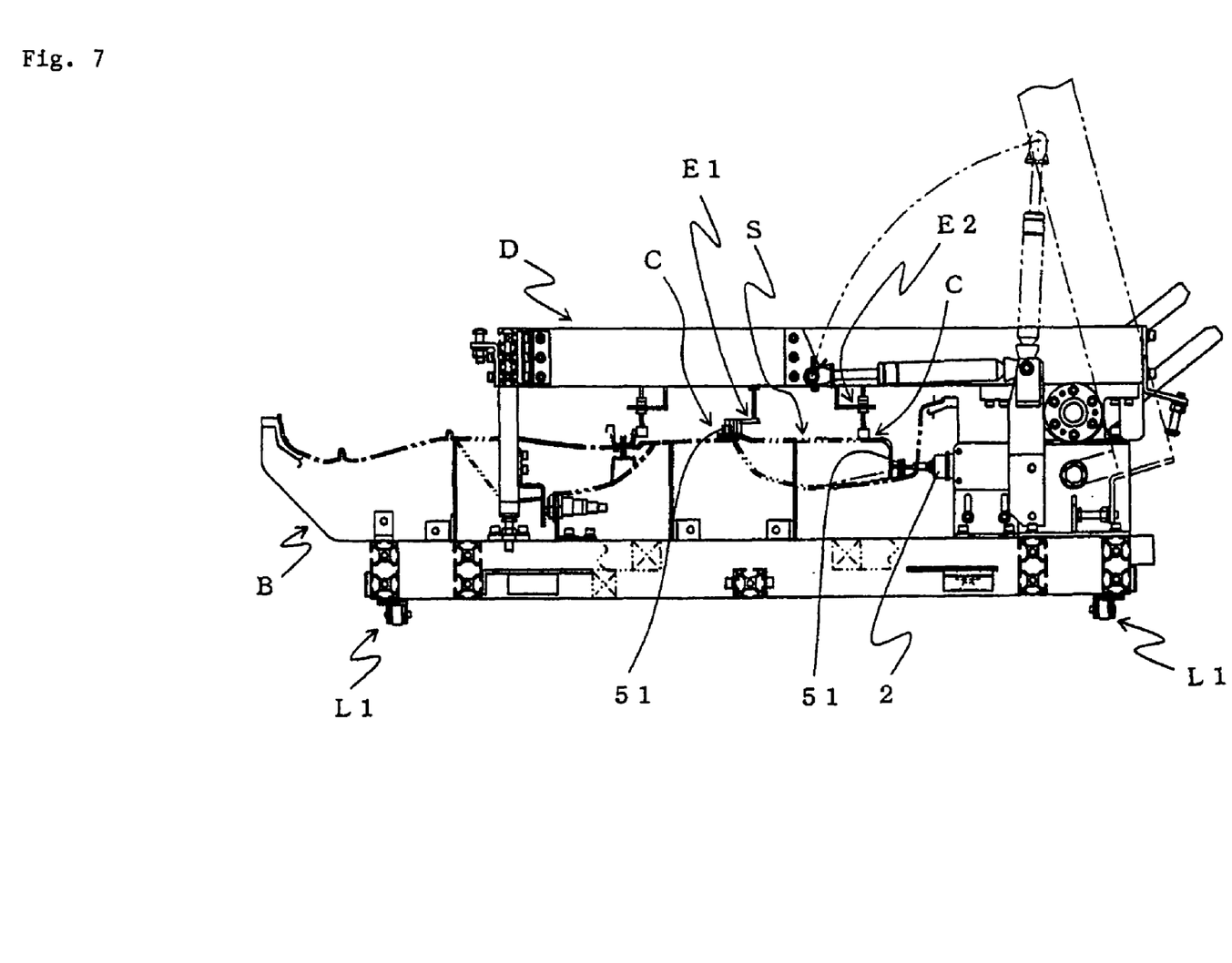
FIG. 7 is a schematic view to explain the operation of the jig pallet as shown in FIG. 1.

As in FIGS. 1, 5, and 7, the pressing rods in this embodiment include a first group of pressing rods E1 and a second group of pressing rods E2, in which each rod E2 has a shape that differs from that of each rod E1. In particular, as in FIG. 5, each first pressing rod E1 has a pressing portion 21a, whose cross section of its distal end forms an arc or U-shape such that it is laterally opened, and an adjusting thread 22a standing vertically from the proximal end of the pressing portion 21a. Each second pressing rod E2 has a pressing portion 21b, whose distal end forms a cylinder, and an adjusting thread 22b standing vertically from the proximal end of the pressing portion 21a. The adjusting thread 22b of the second pressing rod E2 is provided with a reinforcing nut 22c to prevent a displacement of the pressing portion 21b when it holds the peripheries of the corresponding treating area.

The shape (the arc or the U-shape) of the opening portion of the pressing portion 21a of the first pressing rod E1 may be adjusted, e.g., a part of the peripheries of an ultrasonic head having a round shape in cross section, if it is used as a working tool.

If an area to be processed of the workpiece is a recess on which a welding boss is welded and bonded, it may be difficult for the pressing portion 21a of the first pressing rod E1 to directly hold the periphery of the welding boss. In such a situation, the second pressing rod E2, having the pressing portion 21b with the cylindrical distal end, may be used. Namely, the lower face of the cylindrical pressing portion 21b may bear down on the peripheries C at a position slightly away from the recess to be processed.

Of course, the usages and configurations of the pressing portions 21a and 21b described above are just for exemplifying purposes, but the present in is not limited to them. For instance, because the shape of the opening portion of the pressing portion 21a of the first pressing rod E1 can be designed to fit a shape in cross section of the corresponding processing machine, it is not limited to the arc or the U-shape as shown in the figures. Also, the shape of the pressing portion 21b of the second pressing rod E2 is not limited to the cylindrical shape as shown in the figures. Although two types of pressing portions 21a and 21b are described herein, three or more types of them may be used, if desired.

The adjusting mechanisms F are provided to adjust the levels of the pressing rods E1, E2 and thus the pressing portions 21a, 21b. Each adjusting mechanism F includes L-shaped plates 23a and 23b. Horizontal portions of the L-shaped plates 23a and 23b are provided with holes in which the adjusting threads 22a and 22b are inserted. Each adjusting mechanism F also includes lower nuts 24a and upper nuts 24b to be threaded on the adjusting threads 22a, 22b inserted in the holes on the horizontal portions of the L-shaped plates 23a and 23b, beneath and above the horizontal portions. Preferably the upper nuts 24b are double nuts, since adjusting the levels of the pressing portions 21a and 21b may be readily carried out above the horizontal portions of the L-shaped plates 23a and 23b, rather than under them. The number 25 denotes a washer.

Positioning the pressing members 21a and 21b in the horizontal direction can be carried out by horizontally moving the corresponding bolts 26, which are inserted into the mated holes on vertical portions of the L-shaped plates 23a and 23b, along the corresponding grooves on the frame 27, and by fixing the corresponding bolts 26 at desired positions. In FIG. 5, the number 28 denotes an adjusting pedestal or a spacer for horizontally moving the pressing rod E in a direction that is orthogonal to the horizontal direction of the frame 27.

The mechanism for opening and closing the openable and closable member D includes a bearing support member 31, which is located under a pair of opposed frames D1 extending orthogonally to the conveying direction L, a rotary shaft 32 that is journaled on the bearing support member 31, an array of bearings to rotatably support the rotary shaft 32 beneath the transporter A, and an openable and closable lever 33. A driving mechanism (not shown) for driving the opening and closing mechanism is located alongside the assembly line. Such a driving mechanism includes, e.g., a driving motor (not shown) having a pivotal shaft and a pivotal plate having an engaging member 34 that is fixed to the pivotal shaft. When the engaging member 34 is pivoted, it engages a notch 33a of the openable and closable lever 33.

In this embodiment, because the driving mechanism is located alongside the assembly line, the jig pallet can be lightweight. The unit of bearings may be three pillow block bearing units 35, which are located at the ends of the rotary shaft 32 and one side of the openable and closable lever 33.

First and second stoppers 36 and 37 are mounted to position the openable and closable member D after it is opened or closed. In the open position, the first stopper 36 includes a stopper pin 36a on a plate 36c that is fixed to the side frame D1 and a stopping plate 36b that is mounted on the transporter A. In the closed position, the second stopper 37 includes a stopper pin 37a that is mounted on the transporter A and a stopping plate 37b that is mounted on the lower surface of a supporting frame (or a leg) D2 of the transporter A.

In this embodiment, two sensors, to detect the open and closed positions of the operable and closable member D, are also provided. Namely, a first sensor 38a, for detecting the open position, is mounted inside a pedestal 39, which is located beneath the bearing support member 31, while a second sensor 38b, for detecting the closed position, is mounted on a side frame A4 of the transporter A. Although in this embodiment the first and second sensors 38a and 38b are proximity switches, the sensors need not be limited to them to still be within the scope of the present invention. The first sensor 38a detects the open position of the openable and closable member D by detecting a target 40 on the side frame D1, while the second sensor 38b detects the closed position of the openable and closable member D by detecting a bent plate 41 on the supporting frame D2.

Preferably, a shock absorber 42 is provided between the side frame D1 and the transporter, to absorb any impact applied to the jig pallet and the workpiece thereon by the opening and closing of the openable and closable member D by the opening and closing mechanism and its driving mechanism.

In this embodiment, the levels and the horizontal positions of the pressing rods E1 and E2, which are installed in the operable and closing member D, are adjusted in advance such that they face the peripheries C of the predetermined areas to be processed of the workpiece by the respective processing machines. The operable and closing member D is then opened such that a workpiece S rides on the receiving member B, as shown in FIG. 7. The workpiece S is a component of the resin door-trim in which, e.g., the welding bosses 51 are inserted in the mated holes to be processed. When the workpiece S rides on the receiving member B, the detector or the touch switch 2 indicates that the workpiece S is set in the receiving member B. The operable and closable member D is then turned such that the lower faces of the pressing rods E1 and E2 bear down on the peripheries C of the predetermined areas to be processed. The conveying chains L1 are then driven to convey the jig pallet on which the workpiece is located to the front of the ultrasonic welding and bonding machine. The jig pallet is then identified, positioned, lifted, and fixedly supported such that an ultrasonic head (not shown) ultrasonically welds the welding bosses 51 to swage them. When the ultrasonic welding and bonding process is completed, the jig pallet descends into the conveying chains L1 to be conveyed to the respective following processing machines at a downstream location of the assembly line such that the other predetermined process areas are serially processed.

In this embodiment, although the driving motor (not shown) for driving the opening and closing mechanism of the operable and closable member D is located alongside the assembly line, rather than on the transporter A, the present invention is not limited to this configuration. An air cylinder mounted on the transporter may be replaced with the driving motor to drive the opening and closing mechanism. However, such an arrangement adds weight to the jig pallet. Accordingly, the driving source of the opening and closing mechanism is preferably located outside the jig pallet.

In this embodiment, although to save weight both the transporter A and the openable and closable member D are frameworks, the present invention is not limited to these structures. However, because the pressing mechanism E with the adjusting mechanism F is installed in the openable and closable member 9, to save weight the member D is preferably a framework.

The jig pallet of the present invention can be shared in the assembly line to assemble two or more kinds of workpieces with different shapes in, e.g., the front and the rear, or the right and left. For instance, a mixed production of different designs of door trims for different models of automobiles on one assembly line can be achieved by sharing the same jig pallet on the assembly line.

The disclosed embodiment of the jig pallet of the present invention is adapted to be, but is not limited to, an automatic assembly line. The present invention can also be applied to a fully automated assembly line in which an automatic processing system such as a fully automatic robotic assembly system operates working tools, as well as to an assembly line that includes a manually operated tool. Those skilled in the art will recognize that other various modifications might be practiced within the spirit and the scope of the present invention as defined in the appended claims.

The invention claimed is:

1. A jig pallet for carrying and conveying a workpiece having a portion to be processed along an assembly line where various machines for processing the workpiece are arranged, said jig pallet comprising:

a transporter moveable along a traveling direction of the assembly line; said transporter being located on a pair of conveying chains that are arranged along the traveling direction of the assembly line with a predetermined distance between the conveying chains;

a detector mounted on the transporter for detecting the presence of a workpiece thereon;

a receiving member on the transporter for receiving a workpiece, said receiving member having legs that are arranged as a grid-structure, and a body fixed on said legs for receiving the workpiece, wherein said detector is inserted in a cut out formed on said receiving member to detect the presence of the workpiece thereon by contacting or not contacting the workpiece;

a pressing member arranged to face peripheries of a portion of the workpiece to be processed; and an openable and closable member associated with said pressing member, wherein said openable and closable member is pivotally supported at one end of said transporter to move between a closed position in which said pressing member bears down and to press said peripheries of said portion of the workpiece to be processed and an open position in which the pressing of the pressing member is released to enable the workpiece to be removed from the receiving member.

2. The jig pallet of claim 1, wherein at least either said transporter or said openable and closable member has a framework.

3. The jig pallet of claim 1, wherein said jig pallet further includes an adjusting mechanism to adjust a vertical position and a horizontal position of said pressing member.

4. The jig pallet of claim 3, wherein said openable and closable member has a framework having guiding slots to horizontally guide said pressing member.

5. The jig pallet of claim 1, wherein a plurality of bearings is arranged in said transporter, and wherein said jig pallet further includes an opening and closing mechanism for opening and closing said openable and closable member, said opening and closing mechanism including a rotary shaft that is supported to rotate on said bearings at a side opposed to said openable and closable member, and wherein said jig pallet further includes an opening and closing lever fixed to said rotary shaft such that said opening and closing lever engages an engaging member of a driving mechanism for driving said opening and closing mechanism to open and close said openable and closable member.

6. The jig pallet of claim 5, wherein said opening and closing mechanism has a shock absorber to absorb any impact caused by its opening and closing.

7. The jig pallet of claim 1, wherein said jig pallet further includes a detecting means for detecting positions when said openable and closable member is opened and closed.

8. The jig pallet of claim 1, wherein said transporter includes a position sensing means for sensing that said jig pallet has reached a working position of a machine for processing on the assembly line, and a positioning member to position said jig pallet.

9. The jig pallet of claim 1, wherein said body of said receiving member is a molded main body composed of a base material of a fiber-reinforced plastic.

10. The jig pallet of claim 9, wherein a skin of said molded main body is provided with a urethane rubber.

11. The jig pallet of claim 1, wherein processing machines having working tools are arranged on said assembly line, and wherein a shape of said pressing member includes one to match a cross-sectional profile of a corresponding working tool.

12. The jig pallet of claim 1, wherein said pressing member consists of two or more groups of pressing members, each pressing member of one group differing from that of another group or other groups in its shape.

* * * * *